US010086737B2

(12) United States Patent
Lemaire et al.

(10) Patent No.: US 10,086,737 B2
(45) Date of Patent: Oct. 2, 2018

(54) DUMP BODY FOR A TRUCK

(71) Applicant: L.D. RAINVILLE & FILS INC., Saint-Gabriel-de-Brandon (CA)

(72) Inventors: Benoit Lemaire, St-Jean-de-Matha (CA); Stefane Leib, Saint-Charles-Borommee (CA)

(73) Assignee: INDUSTRIE FABKOR INC., Saint-Gabriel-de-Brandon (CA)

( * ) Notice: Subject to any disclaimer, the term of this patent is extended or adjusted under 35 U.S.C. 154(b) by 201 days.

(21) Appl. No.: 15/055,274

(22) Filed: Feb. 26, 2016

(65) Prior Publication Data

US 2017/0246974 A1   Aug. 31, 2017

(51) Int. Cl.
*B60P 1/16* (2006.01)
(52) U.S. Cl.
CPC ...................... *B60P 1/16* (2013.01)
(58) Field of Classification Search
CPC .............. B60P 1/16; B60P 1/28; B60P 1/286
USPC ....................................................... 298/22 R
See application file for complete search history.

(56) References Cited

U.S. PATENT DOCUMENTS

| 2012/0086185 | A1* | 4/2012 | Kerr | B60P 1/28 280/433 |
| 2015/0035314 | A1* | 2/2015 | Kibler | B60P 1/28 296/183.2 |
| 2016/0355117 | A1* | 12/2016 | Wang | B60P 1/04 |

FOREIGN PATENT DOCUMENTS

| CA | 2802850 | A1 | * | 12/2011 | ............ B60P 1/286 |
| CA | 2716710 | A1 | * | 4/2012 | ............... B60P 1/28 |
| DE | 202011000961 | U1 | * | 6/2011 | ............ B60P 1/26 |
| DE | 102014103931 | A1 | * | 9/2015 | ............ B60P 1/286 |
| EP | 1288065 | A1 | * | 3/2003 | ............... B60P 1/20 |
| EP | 1319584 | A1 | * | 6/2003 | ............ B60P 1/286 |
| EP | 1642766 | A1 | * | 4/2006 | ............ B60P 1/273 |
| EP | 1820691 | A1 | * | 8/2007 | ............ B60P 1/286 |
| EP | 2848977 | A1 | * | 3/2015 | ............... F41G 1/38 |
| EP | 3056381 | A1 | * | 8/2016 | |
| FR | 2843924 | A1 | * | 3/2004 | ............ B60P 1/286 |
| FR | 2928633 | A1 | * | 9/2009 | ............ B60P 1/286 |
| WO | WO-2010076137 | A1 | * | 7/2010 | ............ B60P 1/286 |
| WO | WO-2010076240 | A1 | * | 7/2010 | ............ B21D 53/88 |

* cited by examiner

*Primary Examiner* — Hilary L Gutman
(74) *Attorney, Agent, or Firm* — BCF LLP

(57) ABSTRACT

A dump body for a truck has rear left and right pillars, a tailgate pivotally connected to the pillars, left and right upper rails connected to the rear left and right pillars at their rear ends, a front wall connected to the front ends of the upper rails, a left side wall connected to the front wall, the left upper rail and the rear left pillar, a right side wall connected to the front wall, the right upper rail and the rear right pillar, a floor connected to the front wall, the rear pillars, and the lower ends of the side walls, and front and rear support assemblies connected to an underside of front and rear portions of the floor. A majority of an underside portion of the floor located longitudinally between the support assemblies is free of structural support members. A truck having the dump body is also described.

19 Claims, 12 Drawing Sheets

DUMP BODY FOR A TRUCK

FIELD OF TECHNOLOGY

The present technology relates to dump bodies for trucks.

BACKGROUND

Many trucks are provided with dump bodies for the transport of rocks, soil, sand, snow and the like. These dump bodies are typically pivotable to allow for their content to be dumped.

As would be understood, due to the nature of their function, these dump bodies need to be sturdy. As such, they are typically built from relatively thick steel so as to be as rigid as possible. Additionally, to reinforce the floor of the dump bodies, long sills spanning the entire length of the floor are provided under the floor.

However, the type of material used and the long sills result in the dump body being very heavy. As a result, the fuel consumption of a truck having a heavy dump body is negatively affected by this extra weight.

Therefore, there is a desire for a lighter dump body as this would reduce the fuel consumption of the truck having such a dump body and/or would allow the truck to carry heavier cargo.

One solution could be to use a lighter material such as aluminum, however aluminum is too soft and would therefore be too easily damaged.

There is therefore a desire for a dump body for a truck that is relatively lighter while being sufficiently sturdy for the type of use associated with dump truck bodies.

SUMMARY

It is an object of the present technology to ameliorate at least some of the inconveniences present in the prior art.

According to one aspect of the present technology, there is provided a dump body for a truck having a rear left pillar; a rear right pillar; a tailgate pivotally connected to the rear left and rear right pillars; a left upper rail having a rear end connected to an upper portion of the rear left pillar, the left upper rail extending forwardly from the upper portion of the rear left pillar; a right upper rail having a rear end connected to an upper portion of the rear right pillar, the right upper rail extending forwardly from the upper portion of the rear right pillar; a front wall connected to a front end of the left upper rail and to a front end of the right upper rail; a left side wall connected to the front wall, the left upper rail and the rear left pillar, the left side wall extending below the left upper rail; a right side wall connected to the front wall, the right upper rail and the rear right pillar, the right side wall extending below the right upper rail; a floor connected to the front wall, the rear left pillar, the rear right pillar, a lower end of the left side wall and a lower end of the right side wall; a front support assembly connected to an underside of a front portion of the floor; and a rear support assembly connected to an underside of a rear portion of the floor. A majority of an underside portion of the floor located longitudinally between the front support assembly and the rear support assembly is free of structural support members.

According to some implementations of the present technology, an entirety of the underside portion of the floor located longitudinally between the front support assembly and the rear support assembly is free of structural support members.

According to some implementations of the present technology, a central support assembly is connected to an underside of a central portion of the floor. An entirety of an underside portion of the floor located longitudinally between the front support assembly and the central support assembly is free of structural support members. An entirety of an underside portion of the floor located longitudinally between the rear support assembly and the central support assembly is free of structural support members.

According to some implementations of the present technology, the left and right upper rails are hollow.

According to some implementations of the present technology, a bottom and a least a portion of a left side of the left upper rail are integrally formed with the left side wall. A top and a right side of the left upper rail are formed by a left beam having an inverted J-shaped cross-section. The left beam is connected to the bottom and at least the portion of the left side of the left upper rail. A bottom and a least a portion of a right side of the right upper rail are integrally formed with the right side wall. A top and a left side of the right upper rail are formed by a right beam having an inverted J-shaped cross-section. The right beam is connected to the bottom and at least the portion of the right side of the right upper rail.

According to some implementations of the present technology, the floor is thicker than the left and right side walls.

According to some implementations of the present technology, the floor has a laterally central flat portion, a left arcuate portion and a right arcuate portion.

According to some implementations of the present technology, a width of the central flat portion is greater than a sum of the radius of curvature of the left arcuate portion and of the radius of curvature of the right arcuate portion. The radii of curvature of the left and right arcuate portions are equal.

According to some implementations of the present technology, the left and right arcuate portions each define an arc between 45 and 55 degrees.

According to some implementations of the present technology, the rear left pillar has an arcuate portion cradling a rear of the left arcuate portion of the floor, and the rear right pillar has an arcuate portion cradling a rear of the right arcuate portion of the floor.

According to some implementations of the present technology, a front left cradle cradles a front portion of the left arcuate portion of the floor, and a front right cradle cradles a front portion of the right arcuate portion of the floor.

According to some implementations of the present technology, the front and rear support assembly are connected to the laterally central flat portion of the floor.

According to some implementations of the present technology, a top portion of the left arcuate portion of the floor is welded to a bottom of the left side wall, and a top portion of the right arcuate portion of the floor is welded to a bottom of the right side wall.

According to some implementations of the present technology, the front support assembly has a pair of laterally spaced front support members.

According to some implementations of the present technology, the front support assembly has a pair of bumpers connected to the pair of front support members.

According to some implementations of the present technology, the rear support assembly has a pair of laterally spaced rear support members.

According to some implementations of the present technology, wherein the front wall defines a recess for receiving a hydraulic actuator therein.

According to some implementations of the present technology, the left and right side walls and the floor are made of high strength steel having a yield strength of at least 100 ksi (689.5 MPa).

According to another aspect of the present technology, there is provided a truck having a frame, a cab connected to the frame, a plurality of wheels connected to the frame, and the above-mentioned dump body connected to the frame. The front and rear support assemblies of the dump body abut the frame.

According to some implementations of the present technology, the dump body is pivotally connected to the frame at a rear thereof. The truck also has a hydraulic actuator connected between the frame and the front wall of the dump body. The hydraulic actuator pivots the dump body between a lowered position and a raised position. The front and rear support assemblies of the dump body abut the frame when the dump body is in the lowered position.

For purposes of the present application, terms related to spatial orientation such as front, rear, left and right should be understood as they would normally be understood by a driver of a truck having a dump body sitting in the truck in a normal driving position with the dump body in a lowered position.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
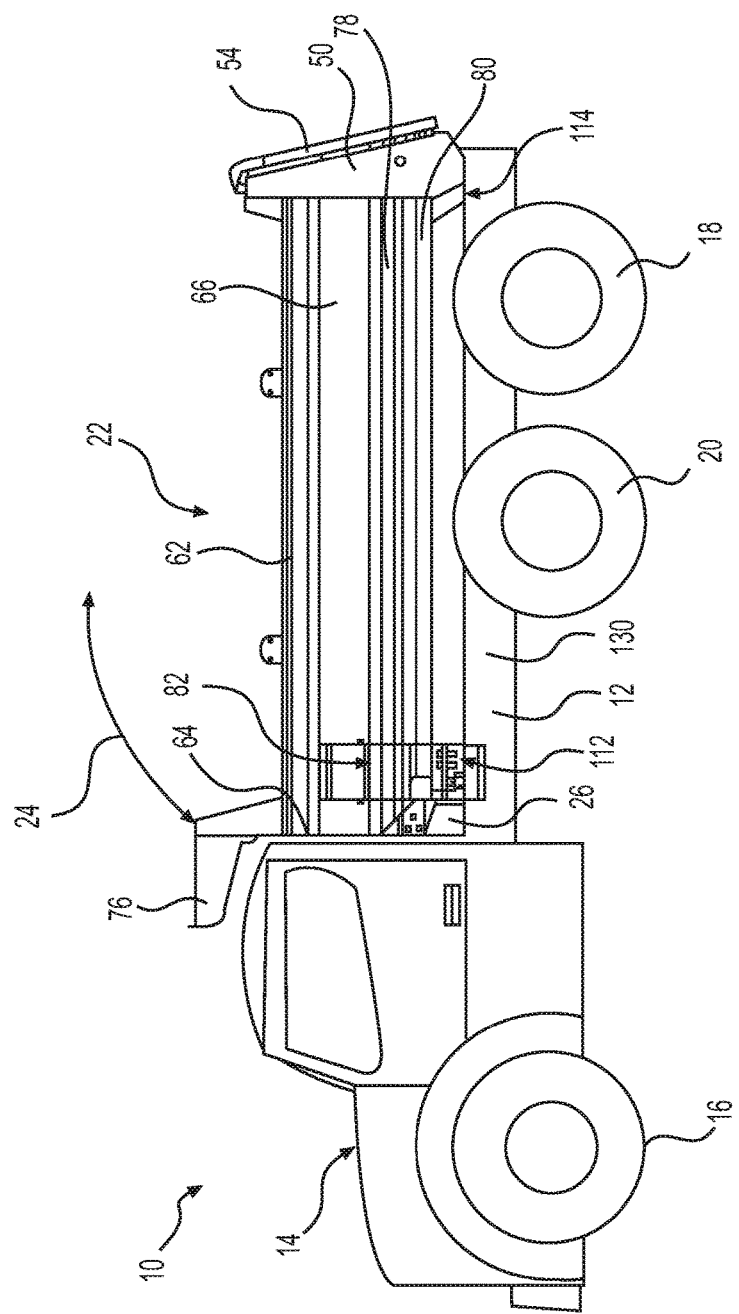
FIG. 1 is a left side elevation view of a truck having a dump body.

FIG. 1 illustrates an implementation of a truck 10. The truck 10 has a frame 12. A cab 14 is connected to a front of the frame 12. Two steerable front wheels 16 (only one of which is shown) are connected to the frame 12 at a front thereof. Four rear wheels 18 (two on the right, two on the left, only one of which is shown) are connected to the frame 12 at a rear thereof. Four intermediate wheels 20 (two on the right, two on the left, only one of which is shown) are connected to the frame 12 at a position forward of the rear wheels 18. It is contemplated that the truck 10 could have more or less wheels than described above.

A dump body 22 is pivotally connected to the frame 12 at a rear thereof so that the dump body 22 can pivot between a lowered position (shown) and a raised position as indicated by line 24. In the raised position, the dump body 22 can empty its content through a rear thereof. A hydraulic actuator 26 is pivotally connected to the frame 12 and to the front of the dump body 22. The hydraulic actuator 26 can extend to pivot the dump body 22 to the raised position and can contract to return the dump body 22 to the lowered position. The manner in which the hydraulic actuator 26 is connected to the dump body 22 will be described in more detail below.

The above description of a truck 10 is only one possible implementation of a truck. Other implementations of a truck having the dump body 22 are also contemplated.

Turning now to FIGS. 2 to 18, the dump body 22 will be described in more detail. In the present implementation, unless specifically stated otherwise, the various components of the dump body are welded to each other. It is contemplated that at least some of the connections between the components could be fastened to each other in addition to or instead of the welds.

As can be seen in FIGS. 2 to 7, the dump body 22 has a rear left pillar 50 and rear right pillar 50. A pair of brackets 52 is connected to the top of the rear pillars 50. A tailgate 54 has a pair of hooks 56 that are pivotally connected to brackets 52. When the dump body 22 is in the lowered position, the tailgate 54 abuts the rear side of the rear pillars 50. As the dump body 22 is pivoted to the raised position, the tailgate 54 pivots away from the rear pillars 50 by gravity. A tailgate locking mechanism (not shown) is provided to lock the tailgate 54 in position against the rear pillars 50. It is contemplated that actuators could be provided to move the tailgate 54 relative to the rear pillars 50. A bent rear plate 60 (FIG. 5) extend laterally between the lower ends of the rear pillars 50.

Figure 2:
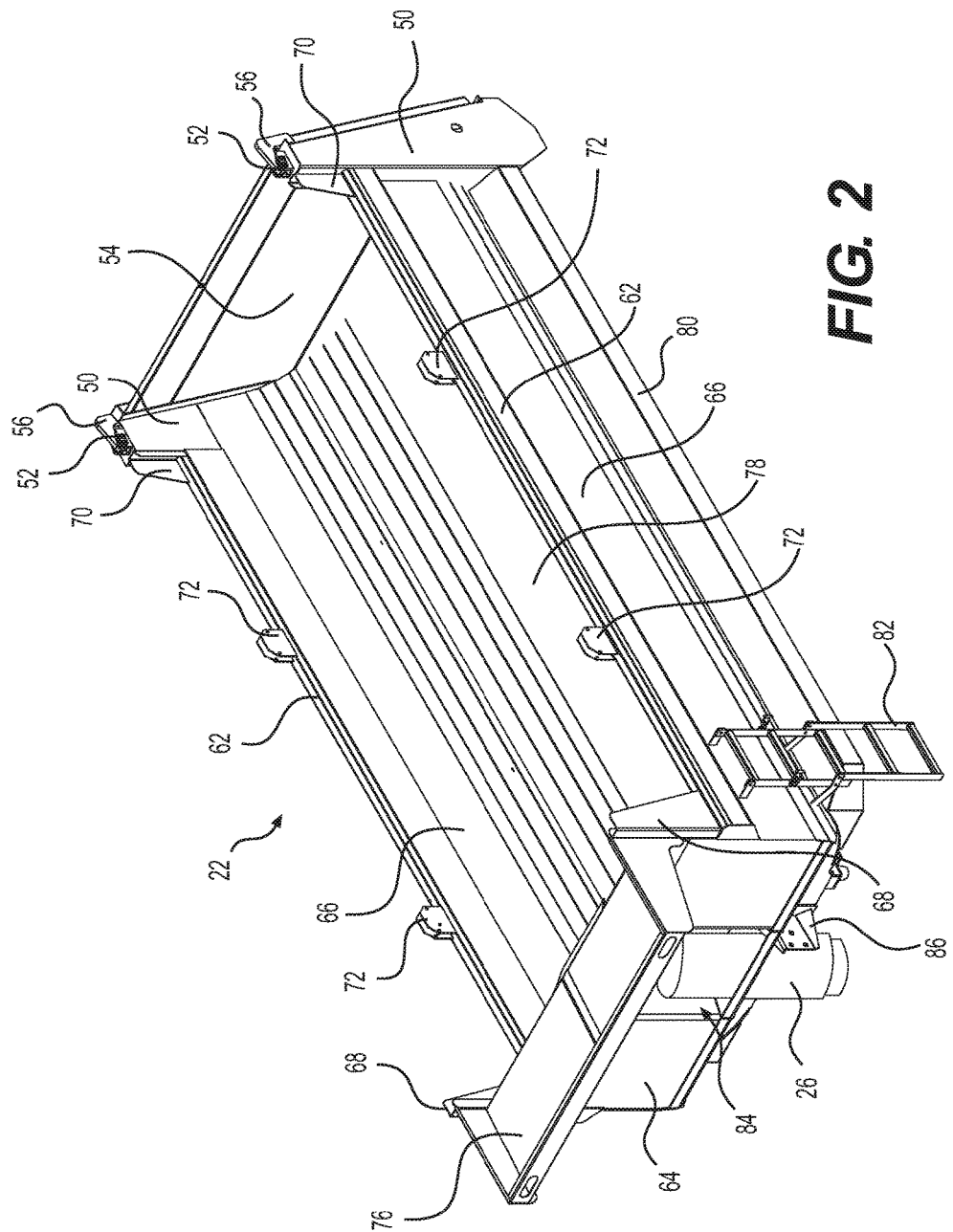
FIG. 2 is a perspective view taken from a top, front, left side of a hydraulic actuator and the dump body of FIG. 1.
Figure 3:
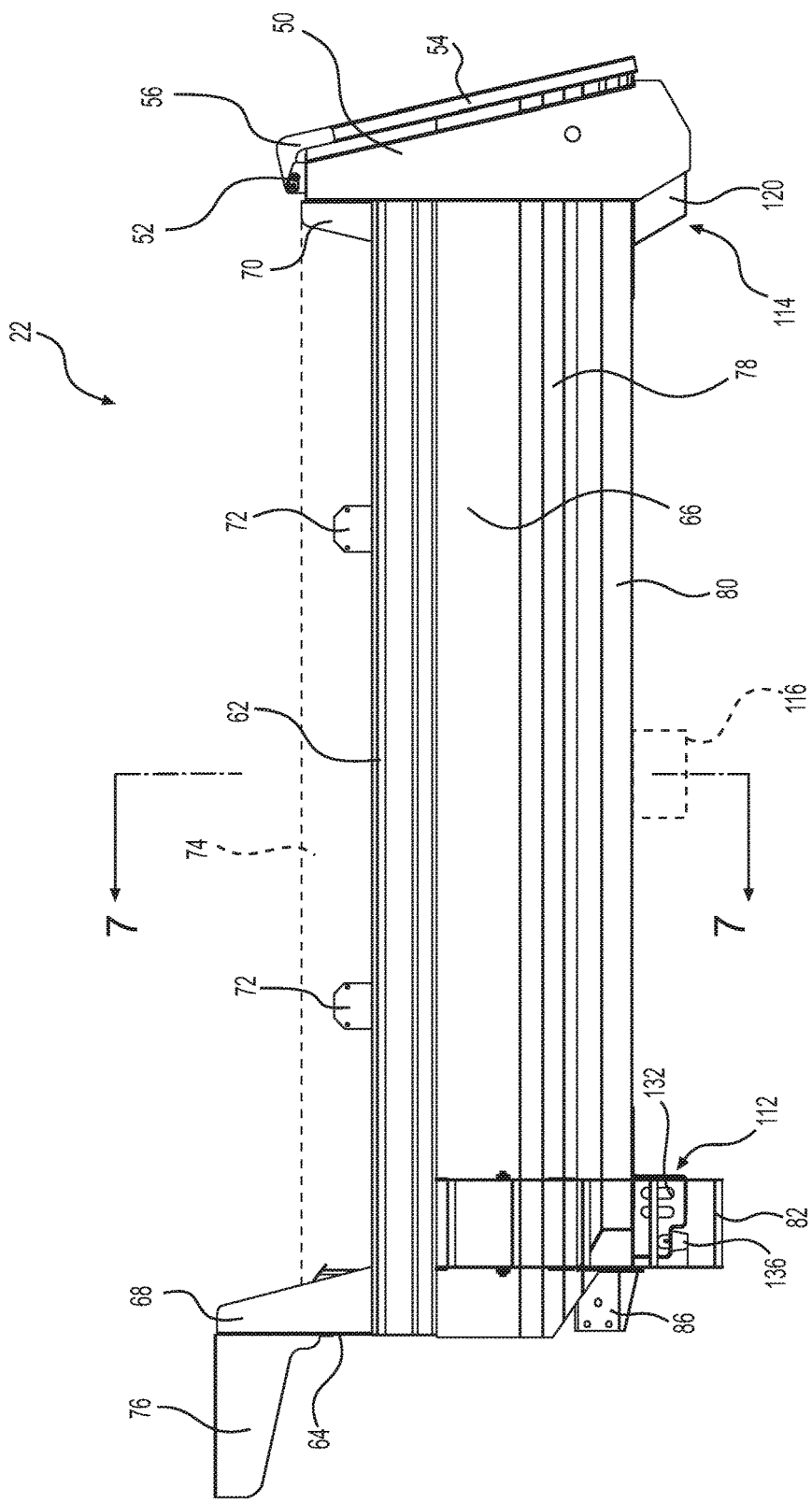
FIG. 3 is a left side elevation view of the dump body of FIG. 2.
Figure 6:
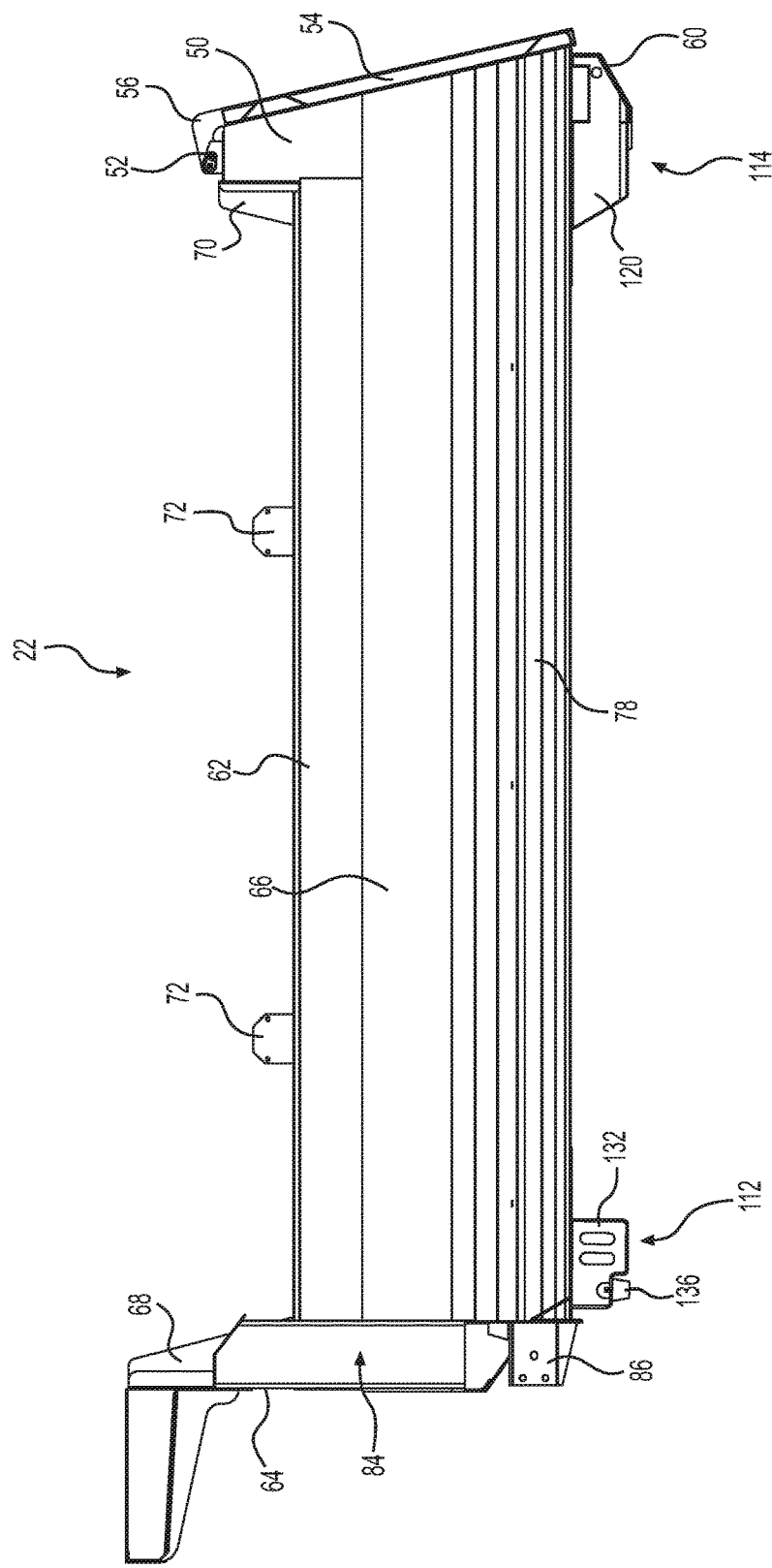
FIG. 6 is a cross-sectional view of the dump body of FIG. 2 taken through line 6-6 of FIG. 4.

Left and right upper rails 62 are connected at their rear ends to the upper portions of the rear left and right pillars 50 respectively. A front wall 64 is connected to the front ends of the left and right upper rails 62. A left side wall 66 extends below the left upper rail 62. The left side wall 66 is connected at its front to the front wall 64 and at its rear to the rear left pillar 50. Similarly, a right side wall 66 extends below the right upper rail 62. The right side wall 66 is connected at its front to the front wall 64 and at its rear to the rear left pillar 50. As can be seen in FIGS. 2 and 6, the rear portion of the right side wall 66 extends along the left side of the rear right pillar 50. The rear portion of the left side wall 66 extends similarly along the right side of the rear left pillar 50.

For each of the upper rails 62, a front bracket 68 is connected between the front wall 64 and the top of the upper rail 62, a rear bracket 70 is connected between the rear pillar 50 and the top of the upper rail 62 and two central brackets 72 are connected to the top of the upper rails 62 longitudinally between the brackets 68, 70. The brackets 68, 70 and 72 are adapted to receive side wall extensions 74 (shown in dotted lines in FIG. 3) that can be optionally be provided on the dump body 22 to increase the height of the sides of the dump body 22. It is contemplated that the brackets 68, 70 and 72 could be omitted. A cab cover 76 is connected to the top of the front wall 64 and extends forwardly thereof. As can be seen in FIG. 1, when the dump body 22 is in the lowered position, the cab cover 74 extends over the top of the rear portion of the cab 14. It is contemplated that the cab cover 76 could be omitted.

The dump body 22 has a floor 78 connected at its front to the front wall 64, at its rear to the rear pillars 50 and at its left and right sides to the lower ends of the left and right side walls 66 respectively. Non-structural side caps 80 are provided on each side of the floor 78 for aesthetic purposes. It is contemplated that the caps 80 could be omitted.

A ladder 82 is mounted to the front left side of the dump body 22. It is contemplated that the ladder 82 could be mounted elsewhere on the dump body 22. It is also contemplated that the ladder 82 could be omitted.

Figure 4:
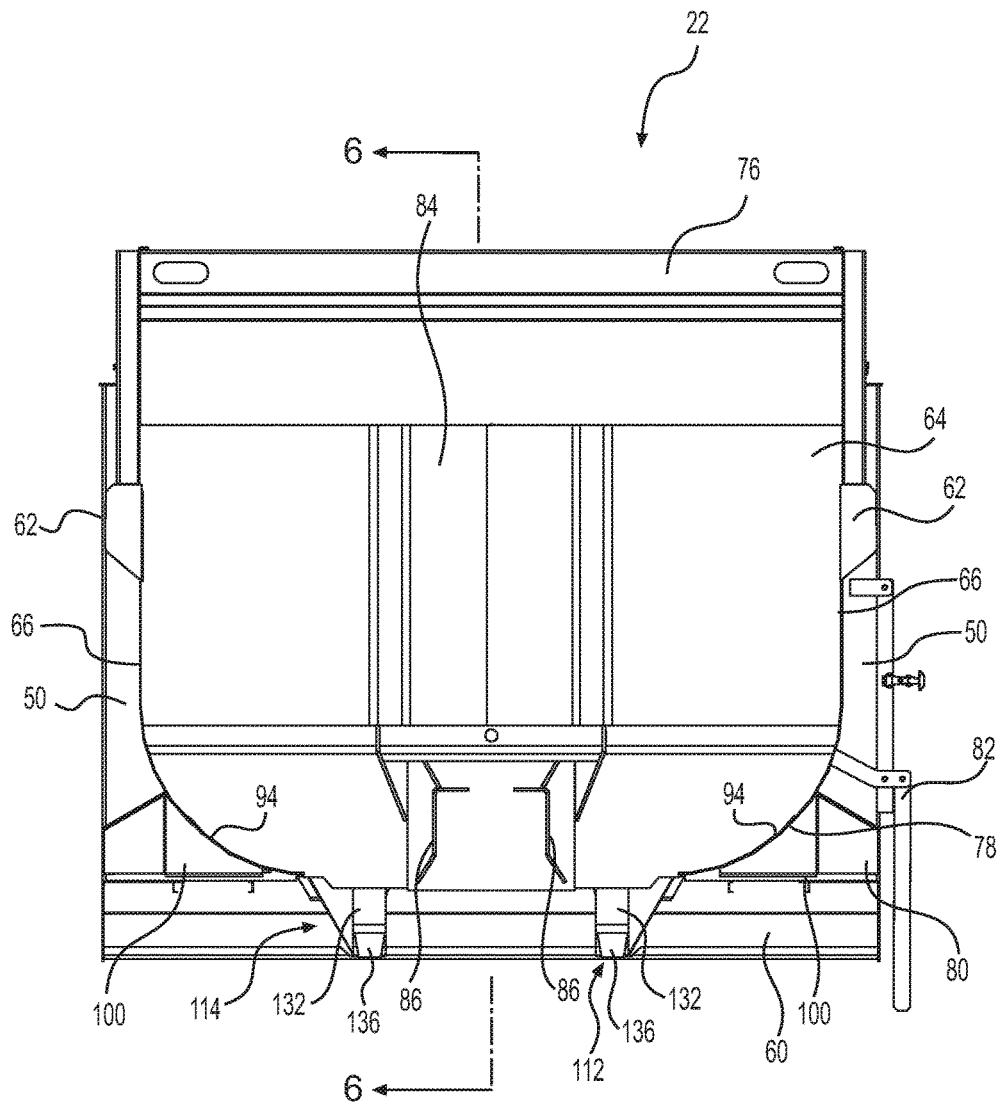
FIG. 4 is a front elevation view of the dump body of FIG. 2.
Figure 5:
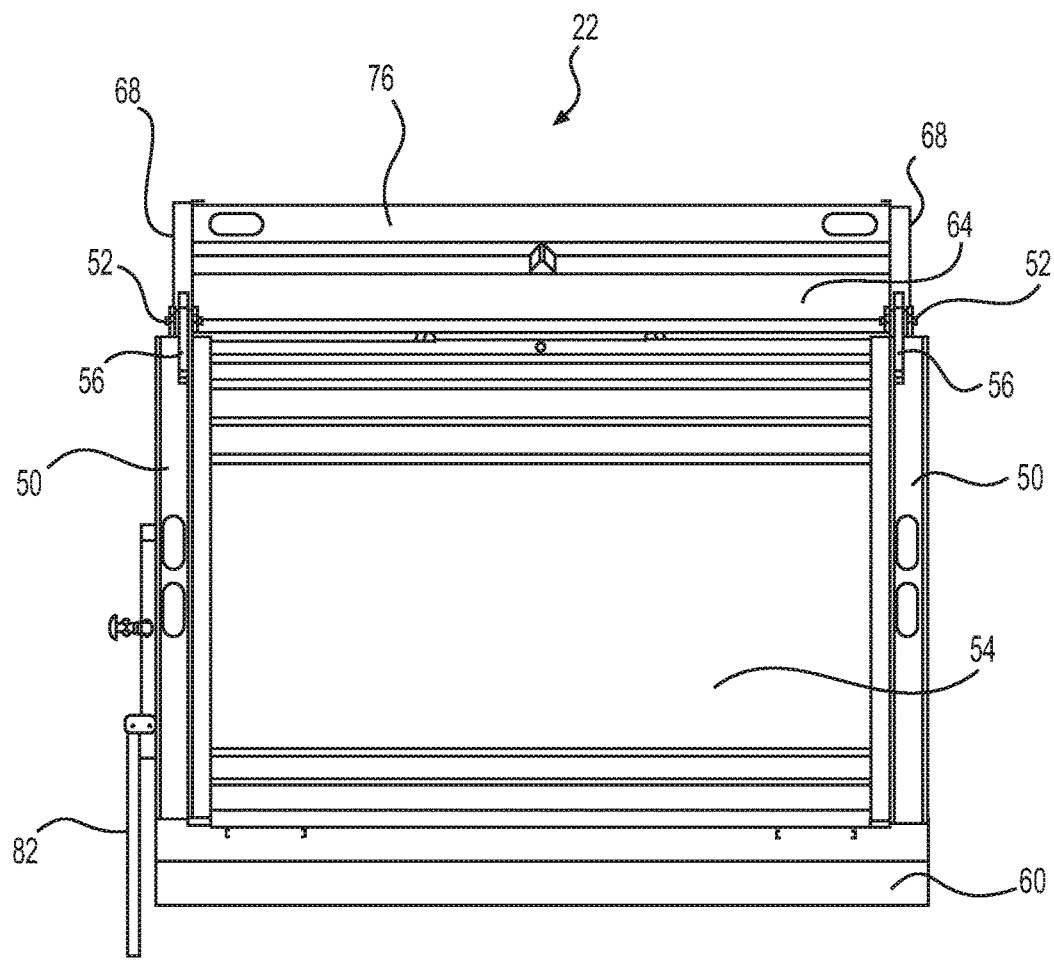
FIG. 5 is a rear elevation view of the dump body of FIG. 2.

As can be seen in FIGS. 2, 4 and 6, the front wall 64 defines a recess 84 at a center thereof of. A pair of brackets 86 is connected to the front of the front wall 64 near a bottom thereof in alignment with the recess 84. As can be seen in FIG. 2, the hydraulic cylinder 26 is received in the recess 84 between the brackets 86. The hydraulic cylinder 26 is pivotally fastened to the brackets 84. As mentioned above, the hydraulic cylinder 26 is connected at its lower end to the frame 12. It is contemplated that the front wall 64 could not be provided with the recess 84, in which case the hydraulic cylinder 26 would be provided completely in front of the front wall 62. It is contemplated that the hydraulic cylinder 26 could be mounted between the frame 12 and the dump body 22 in other ways.

Figure 7:
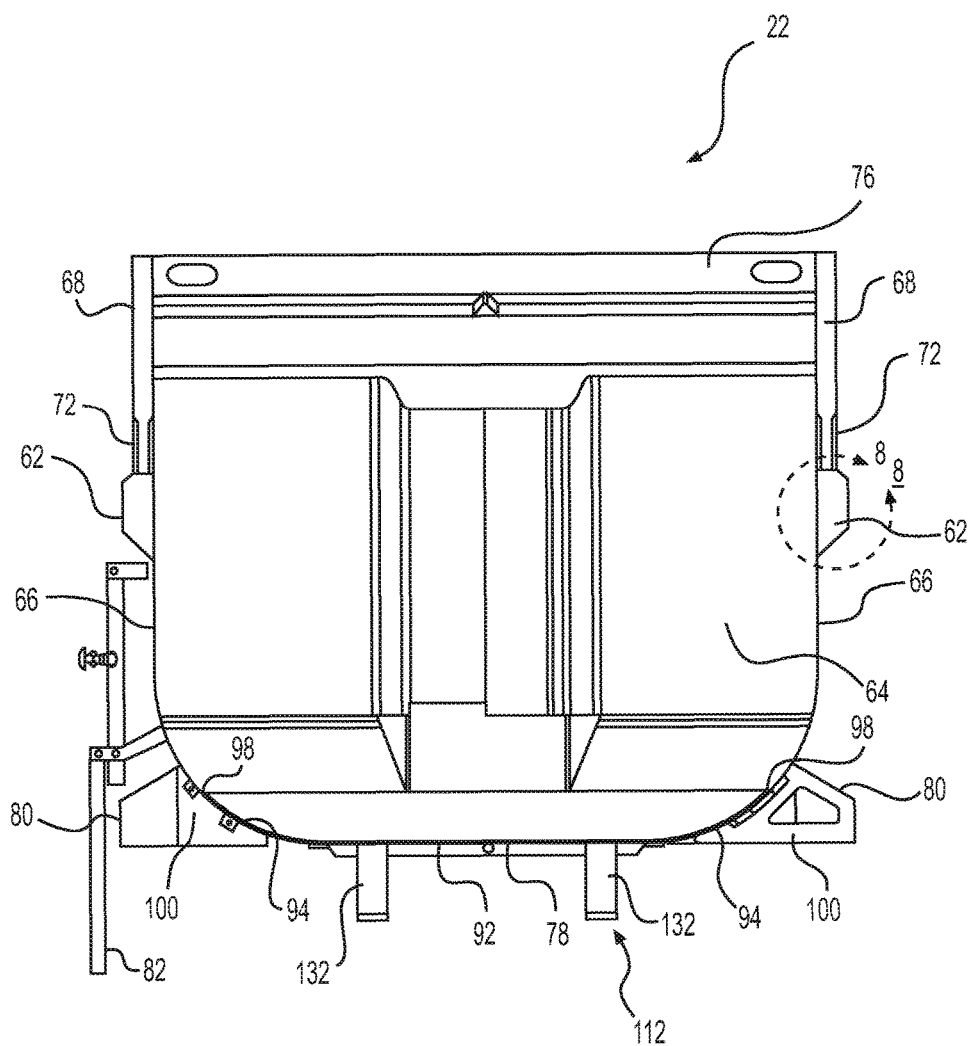
FIG. 7 is a cross-sectional view of the dump body of FIG. 2 taken through line 7-7 of FIG. 3.
Figure 8:
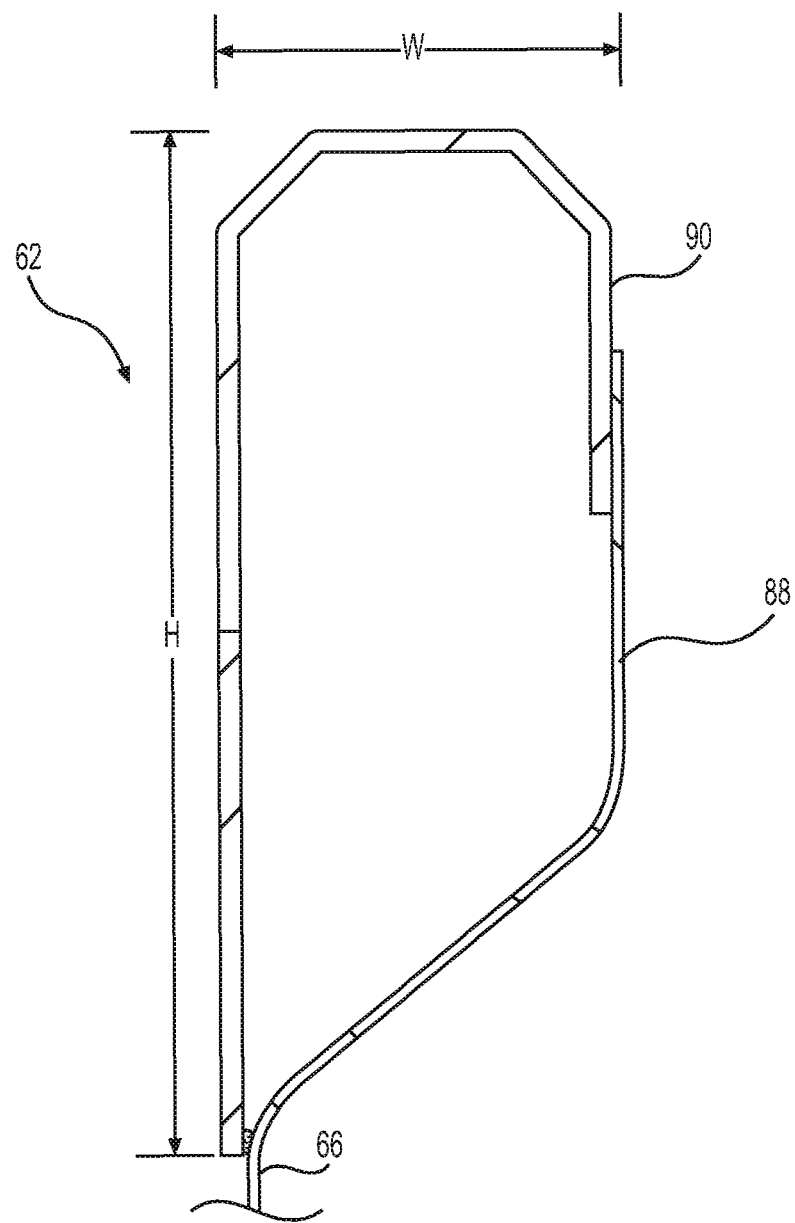
FIG. 8 is a close-up view of section 8-8 of FIG. 7 showing a cross-section of a rail of the dump body of FIG. 2.

As can be seen in FIG. 7, the upper rails 62 are hollow. The right upper rail 62 will be described in more detail with reference to FIG. 8. The left upper rail 62 is a mirror image of the right upper rail 62 and will therefore not be described in detail herein. In the present implementation, the right upper rail 62 is made in two parts 88 and 90. The part 88 defines the bottom and part of the right side of the right upper rail 62. As can be seen, in the present implementation, the right side wall 66 and the part 88 of the right upper rail 62 are integrally formed. The piece of metal used to form the right side wall 66 is bent in two places near its upper end to form the bottom and the portion of the right side of the right upper rail 62 (i.e. to form the part 88 of the right upper rail 62). It is contemplated that the right side wall 66 and the part 88 of the right upper rail 62 could be separate parts that are welded or otherwise connected together. The part 90 defines the left side, the top and part of the right side of the right upper rail 62. The part 90 is a beam having a generally inverted J-shaped cross-section. The bottom end of the left leg of the part 90 is welded to the upper end of the right side wall 66 just below the bend between the right side wall 66 an the bottom of the right upper rail 62. The bottom portion of the right leg of the part 90 is disposed laterally inward of the vertical portion of the part 88 and overlaps the vertical portion of the part 88. The parts 88 and 90 are welded to each other where they overlap. As can be seen, the part 90 is thicker than the part 88, and is therefore also thicker than the right side wall 66. In the present implementation, the part 88 and the right side wall 66 are made of high strength steel having a Brinell hardness of 450, a yield strength of at least 100 ksi (kilopound per square inch, i.e. 689.5 MPa) and a thickness of ⅛ of an inch (i.e. 3.175 mm). One example of such steel is Domex™ steel. This high hardness allows the side wall 66 to resist the impacts which occur when the dump body 22 is being loaded with hard materials such a rocks for example. In the present implementation, the part 90 is made of ASTM A36 grade carbon steel having a thickness of 3/16 of an inch (i.e. 4.7625 mm). It is contemplated that the parts 88 and 90 could be made of other materials having other thicknesses. As can also be seen, a height H of the right upper rail 62 is greater than its width W. In the present implementation, the height H is more than 2.5 times the width W. More specifically, in the present implementation the height H is 12 1/16 inches (i.e. 30.64 cm) high by 4⅝ inches (i.e. 11.43 cm) wide. Other dimensions are contemplated. As will be described in more detail below, the dump body 22 is not provided with the longitudinally extending long sills typically provided under the floor of other dump bodies. As such, the left and right upper rails 62 are designed to act as beams fixed at both ends to support a majority of the load applied to the side walls 66 and the floor 78 when the dump body 22 is filled since the side walls 66 and the floor 78 are essentially suspended from the upper rails 62 due to the lack of long sills.

Figure 18:
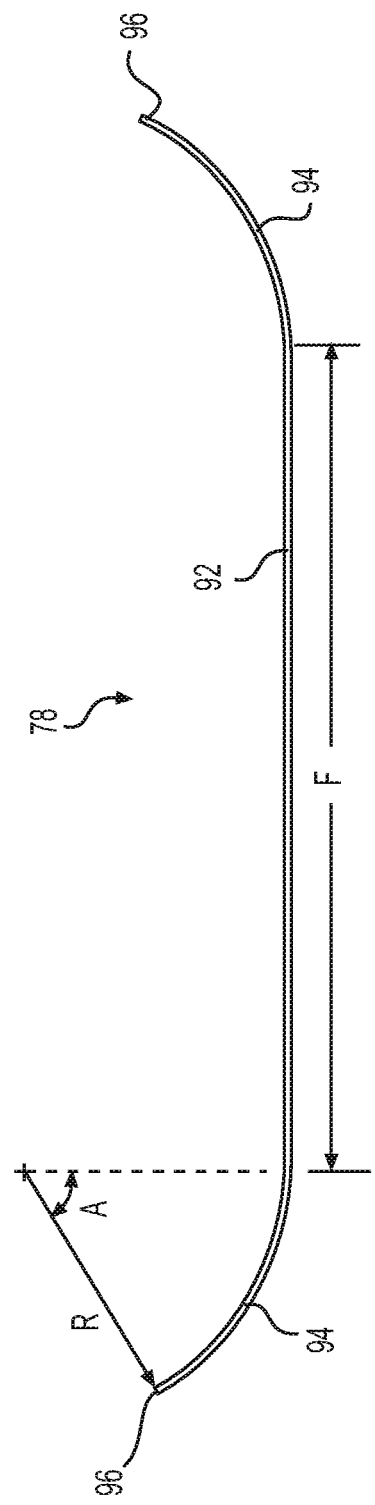
FIG. 18 is a front elevation view of a floor of the dump body of FIG. 2.

Turning now to FIG. 18, the floor 78 will be described in more detail. The floor 78 has a laterally central flat portion 92 and left and right arcuate portions 94. As can be seen in FIG. 7, the lower portion of each of the side walls 66 is also arcuate. The top portion 96 of each of the arcuate portions 94 sits on top of and overlaps the bottom of its respective side wall 66. The arcuate portions 94 are welded to their respective side walls 66 along these overlaps 98. The width F of the laterally flat central portion 92 is greater than the sum of the radii of curvature R of the arcuate portions 94. In the present implementation, the width F is between 45 and 50 inches (i.e. 114.3 to 127 cm) and each radius of curvature R is 21 inches (i.e. 53.34 cm). Each arcuate portion 94 defines an arc A between 45 and 55 degrees. The floor 78 is thicker than the side walls 66. In the present implementation, the floor has a thickness of 5/32 of an inch (i.e. 3.96875 mm) and, as described above, the side walls 66 have a thickness of ⅛ of an inch (i.e. 3.175 mm). In the present implementation, the floor 78 is made of the same material as the side walls 66. As such, in the present implementation, the floor 78 is made of high strength steel having a Brinell hardness of 450 and a yield strength of at least 100 ksi (kilopound per square inch, i.e. 689.5 MPa). One example of such steel is Domex™ steel. This high hardness allows the floor 78 to resist the impacts which occur when the dump body 22 is being loaded with hard materials such a rocks for example. It is contemplated that the side walls 66 and the floor 78 could be made of different materials. It is also contemplated that the floor 78 could be made of a material other than the one provided above. As the dump body 22 is not provided with the longitudinally extending long sills typically provided under the floor of other dump bodies, the high yield strength of the material of the floor 78 allows the material to deform when the dump body 22 is filled, but to then return to its original shape when the dump body 22 is emptied (i.e. it does not permanently deform).

Figure 10:
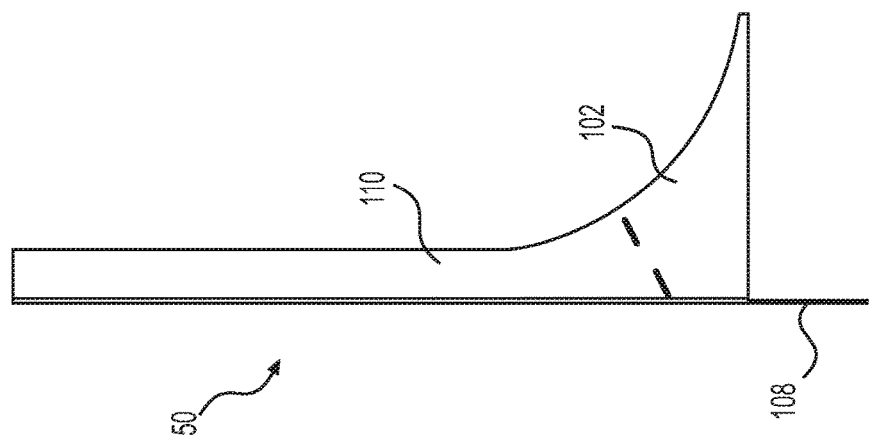
FIG. 10 is a front elevation view of the rear right pillar of FIG. 9.

As can be seen in FIGS. 4 and 7, the dump body 22 has front left and right cradles 100 near a front thereof. The front left cradle 100 cradles the front portions of the arcuate portion of the left side wall 66 and the left arcuate portion 94 of the floor 78. Similarly, the front right cradle 100 cradles the front portions of the arcuate portion of the right side wall 66 and the right arcuate portion 94 of the floor 78. As can be seen in FIG. 10 for the rear right pillar 50, each pillar 50 has an arcuate portion 102. The arcuate portion 102 of the rear left pillar 50 cradles the rear portions of the arcuate portion of the left side wall 66 and the left arcuate portion 94 of the floor 78. Similarly, the arcuate portion 102 of the rear right pillar 50 cradles the rear portions of the arcuate portion of the right side wall 66 and the right arcuate portion 94 of the floor 78.

In alternative implementations (not shown), the floor 78 is flat across it entire width. In one such implementation, the side walls 66 extend vertically straight down to the side edges of the floor 78. In another such implementation, the floor 78 has right and left upwardly extending side walls that connect to the bottom portions of the side walls 66.

Figure 9:
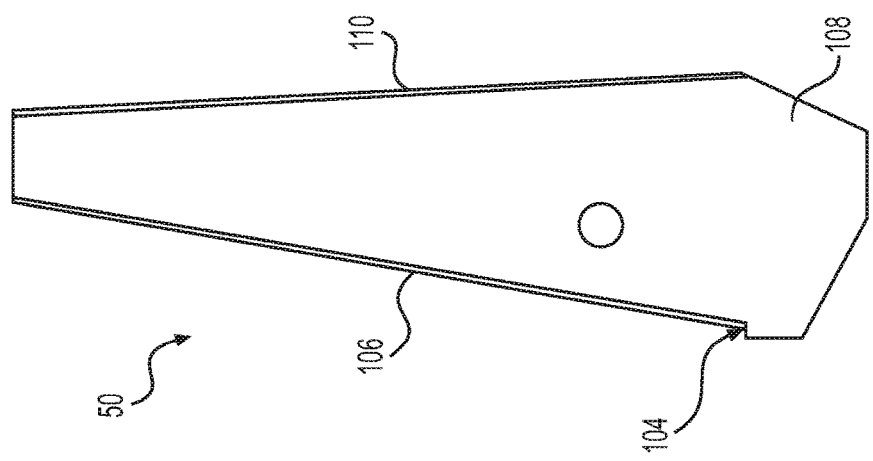
FIG. 9 is a right side elevation view of a rear right pillar of the dump body of FIG. 2.

With reference to FIGS. 9 and 10, the rear right pillar 50 has a notch 104 to receive the lower end of the tailgate 50. When the tailgate 54 is closed, the tailgate 54 abuts an angled rear surface 106 of the rear right pillar 50. The right side of the rear right pillar 50 extends below the arcuate portion 102, thereby providing a plate 108 to which the ends of the rear plate 60 is connected. The front surface 110 of the rear right pillar 50 is vertical. The rear left pillar 50 is a mirror image of the rear right pillar 50 and as such will not be described in detail herein. In the present implementation, the rear pillars 50 are made of ASTM A36 grade carbon steel, but other materials are contemplated.

Figure 11:
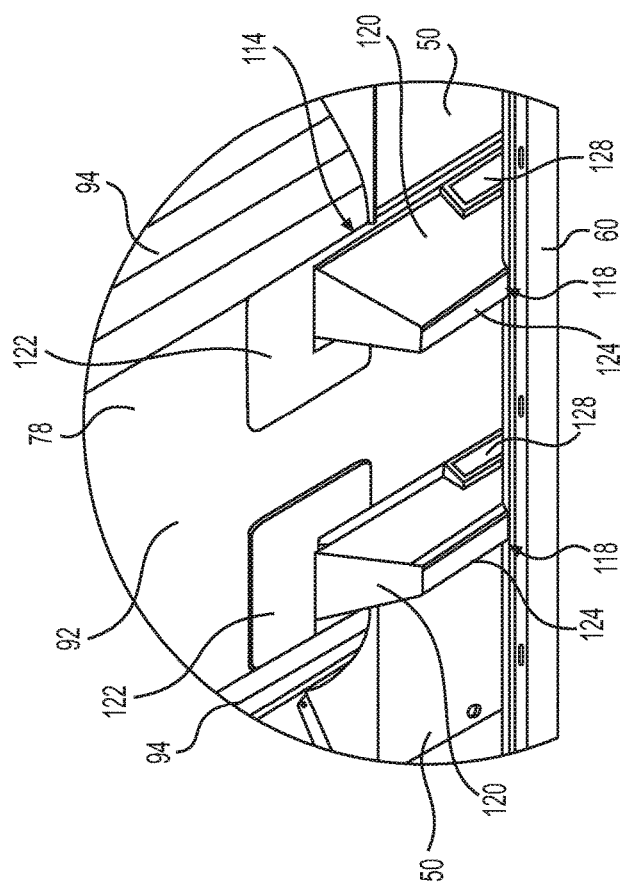
FIG. 11 is a perspective view taken from a bottom, front, left side of a rear bottom portion of the dump body of FIG. 2 showing a rear support assembly.
Figure 12:
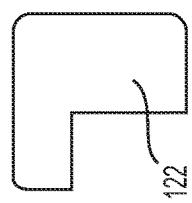
FIG. 12 is a bottom plan view of a plate of the support assembly of FIG. 11.
Figure 15:
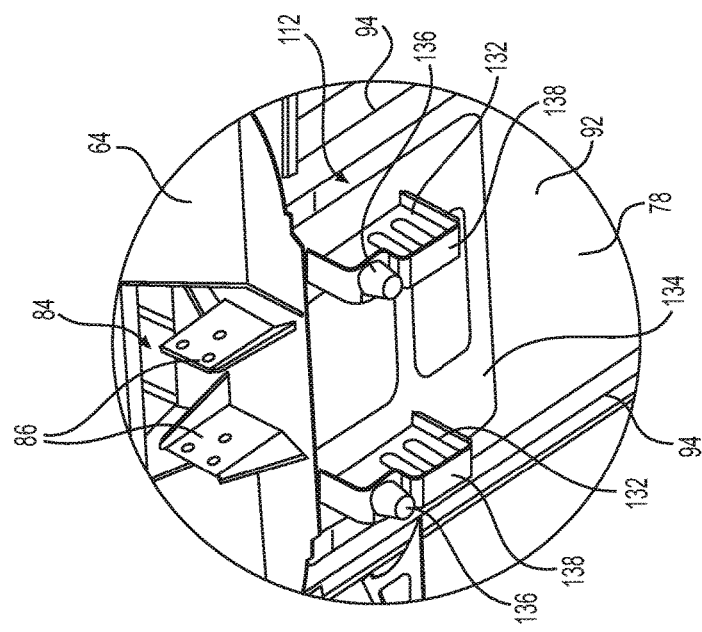
FIG. 15 is a perspective view taken from a bottom, front, left side of a front bottom portion of the dump body of FIG. 2 showing a front support assembly.

The dump body 22 is also provided with a front support assembly 112 and a rear support assembly 114. As best seen in FIG. 15, the front support assembly 112 is connected to the underside of the front portion of the laterally central portion 92 of the floor 78. As best seen in FIG. 11, the rear support assembly 114 is connected to the underside of the rear portion of the laterally central portion 92 of the floor 78. As can be seen in FIG. 1, and as will be described in more detail below, when the dump body 22 is in the lowered position, the front and rear support assemblies 112, 114 abut the top of the rear portion of the frame 12. The entirety of the underside portion of the floor 78 located longitudinally between the front and rear support assemblies 112, 114 is spaced from the frame 12. The entirety of the underside portion of the floor 78 located longitudinally between the front and rear support assemblies 112, 114 is free of structural support members, such as the long sills typically provided under the floor of other dump bodies. As a result, the floor 78 will deform when the dump body 22 is filled, but returns to its initial shape when the dump body 22 is emptied.

In an alternative implementation, in longer dump bodies 22, in order to avoid too much deformation at the center of the floor 78, a central support assembly 116 (shown in dotted lines in FIG. 3) is connected to the underside of the longitudinally central portion of the floor 78. The central support assembly 116 abuts the top of the rear portion of the frame 12 when the dump body 22 is in the lowered position. The entirety of the underside portion of the floor 78 located longitudinally between the front and central support assemblies 112, 116 is free of structural support members. The entirety of the underside portion of the floor 78 located longitudinally between the rear and central support assemblies 114, 116 is also free of structural support members. Although a central support assembly 116 is provided, a majority of the underside portion of the floor 78 located longitudinally between the front and rear support assemblies 112, 114 is still free of structural support members. In another alternative implementation (not shown), a central support assembly is fixedly connected to the frame 12 and the dump body 22 only abuts this central support assembly when it is in the lowered position.

Figure 13:
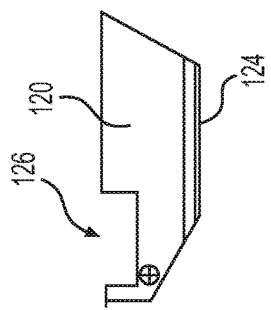
FIG. 13 is a right side elevation view of a left support member of the support assembly of FIG. 11.
Figure 14:
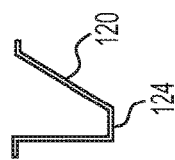
FIG. 14 is a front elevation view of the left support member of FIG. 13.

Turning now to FIGS. 11 to 14, the rear support assembly 114 will be described in more detail. The rear support assembly 114 is made of left and right sub-assemblies 118. As the left and right sub-assemblies 118 are mirror images of each other, only the left sub-assembly 118 will be described. The left sub-assembly 118 has a left rear support member 120 and an L-shaped plate 122 that are both welded to the laterally central portion 92 of the floor 78. The front of the left rear support member 120 is received in the notch defined by the L-shaped plate 122. The bottom surface 124 of the left rear support member 120 abuts the frame 12 when the dump body 22 is in the lowered position. As can be seen in FIG. 14, the left rear support member 120 is hollow and has a generally trapezoidal cross-section that it wider at its top than at its bottom. As can be seen in FIG. 13, the left rear support member 120 has a notch 126 defined in a top thereof. A rectangular duct 128 (FIG. 11) is disposed in the notch 126. The duct 128 receives linkages of the tailgate locking mechanism (not shown) therethrough. In the present implementation, the frame 12 has two spaced apart longitudinally extending frame members 130 (FIG. 1). Each rear support member 120 is laterally aligned with one of these frame members 130 and abuts the top of this frame member 130 when the dump body 22 is in the lowered position. It is contemplated that the rear support assembly 114 could have a single wide rear support member 120 spanning both frame members 130. It is also contemplated that the frame 112 could have more or less than two frame members 130 or a different frame configuration, in which case it is contemplated that the rear support assembly 114 could have more of less rear support members 120.

Figure 16:
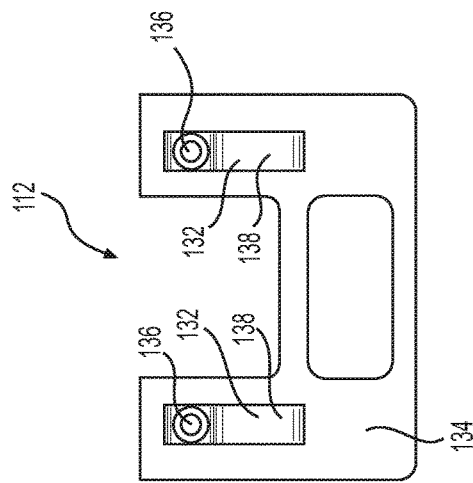
FIG. 16 is a bottom plan view of the front support assembly of FIG. 15.
Figure 17:
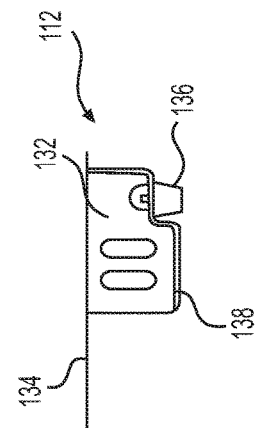
FIG. 17 is a right side elevation view of the front support assembly of FIG. 15.

Turning now to FIGS. 15 to 17, the front support assembly 112 will be described in more detail. The front support assembly 112 has left and right front support members 132 and a plate 134. The plate 134 is welded to the laterally central portion 92 of the floor 78. The left and right front support members 132 are welded to the left and right portions of the plate 134. Bumpers 136 are connected in a notch defined in the front of each front support members 132. When the dump body 22 is not in the lowered position, the bumpers 136 extend slightly below the bottom surfaces 138 of the front support members 132. When the dump body 22 is in the lowered position, the bumpers 136 deform slightly, and the bumpers 136 and the bottom surfaces 138 of the front support members 132 abut the frame 12. Each front support member 132 is laterally aligned with one of the frame members 130 and abuts the top of this frame member 130 when the dump body 22 is in the lowered position. It is contemplated that the front support assembly 112 could have a single wide front support member 132 spanning both frame members 130. It is also contemplated that the frame 112 could have more or less than two frame members 130 or a different frame configuration, in which case it is contemplated that the front support assembly 112 could have more of less front support members 132.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A dump body for a truck comprising:
a rear left pillar;
a rear right pillar;
a tailgate pivotally connected to the rear left and rear right pillars;
a left upper rail having a rear end connected to an upper portion of the rear left pillar, the left upper rail extending forwardly from the upper portion of the rear left pillar;
a right upper rail having a rear end connected to an upper portion of the rear right pillar, the right upper rail extending forwardly from the upper portion of the rear right pillar;
a front wall connected to a front end of the left upper rail and to a front end of the right upper rail;
a left side wall connected to the front wall, the left upper rail and the rear left pillar, the left side wall extending below the left upper rail, a lower portion of the left side wall being arcuate;
a right side wall connected to the front wall, the right upper rail and the rear right pillar, the right side wall extending below the right upper rail, a lower portion of the right side wall being arcuate;
a floor connected to the front wall, the rear left pillar, the rear right pillar, a lower end of the left side wall and a lower end of the right side wall,
the floor having a laterally central flat portion, a left arcuate portion and a right arcuate portion,
the left arcuate portion of the floor sitting on top of and overlapping the lower portion of the left side wall,
the right arcuate portion of the floor sitting on top of and overlapping the lower portion of the right side wall,
a width of the central flat portion being greater than a sum of the radius of curvature of the left arcuate portion and of the radius of curvature of the right arcuate portion, the radii of curvature of the left and right arcuate portions being equal;
a front support assembly connected to an underside of a front portion of the floor; and
a rear support assembly connected to an underside of a rear portion of the floor, a majority of a length of an underside portion of the floor located longitudinally between the front support assembly and the rear support assembly being free of structural support members.

2. The dump body of claim 1, wherein an entirety of the length of the underside portion of the floor located longitudinally between the front support assembly and the rear support assembly is free of structural support members.

3. The dump body of claim 1, further comprising a central support assembly connected to an underside of a central portion of the floor;
wherein an entirety of a length of an underside portion of the floor located longitudinally between the front support assembly and the central support assembly is free of structural support members; and
wherein an entirety of a length of an underside portion of the floor located longitudinally between the rear support assembly and the central support assembly is free of structural support members.

4. The dump body of claim 1, wherein the left and right upper rails are hollow.

5. The dump body of claim 4, wherein:
a bottom and a least a portion of a left side of the left upper rail are integrally formed with the left side wall;
a top and a right side of the left upper rail are formed by a left beam having an inverted J-shaped cross-section, the left beam being connected to the bottom and at least the portion of the left side of the left upper rail;
a bottom and a least a portion of a right side of the right upper rail are integrally formed with the right side wall; and
a top and a left side of the right upper rail are formed by a right beam having an inverted J-shaped cross-section, the right beam being connected to the bottom and at least the portion of the right side of the right upper rail.

6. The dump body of claim 1, wherein the floor is thicker than the left and right side walls.

7. The dump body of claim 1, wherein the left and right arcuate portions each define an arc between 45 and 55 degrees.

8. The dump body of claim 1, wherein:
the rear left pillar has an arcuate portion cradling a rear of the left arcuate portion of the floor; and
the rear right pillar has an arcuate portion cradling a rear of the right arcuate portion of the floor.

9. The dump body of claim 8, further comprising:
a front left cradle cradling a front portion of the left arcuate portion of the floor; and
a front right cradle cradling a front portion of the right arcuate portion of the floor.

10. The dump body of claim 1, wherein the front and rear support assemblies are connected to the laterally central flat portion of the floor.

11. The dump body of claim 1, wherein:
a top portion of the left arcuate portion of the floor is welded to a bottom of the left side wall; and
a top portion of the right arcuate portion of the floor is welded to a bottom of the right side wall.

12. The dump body of claim 1, wherein the front support assembly has a pair of laterally spaced front support members.

13. The dump body of claim 12, wherein the front support assembly has a pair of bumpers connected to the pair of front support members.

14. The dump body of claim 1, wherein the rear support assembly has a pair of laterally spaced rear support members.

15. The dump body of claim 1, wherein the front wall defines a recess for receiving a hydraulic actuator therein.

16. The dump body of claim 1, wherein the left and right side walls and the floor are made of high strength steel having a yield strength of at least 100 ksi (689.5 MPa).

17. A truck comprising:
a frame;
a cab connected to the frame;
a plurality of wheels connected to the frame; and
the dump body of claim 1 connected to the frame, the front and rear support assemblies of the dump body abutting the frame.

18. The truck of claim 17, wherein the dump body is pivotally connected to the frame at a rear thereof;
the truck further comprising a hydraulic actuator connected between the frame and the front wall of the dump body, the hydraulic actuator pivoting the dump body between a lowered position and a raised position, the front and rear support assemblies of the dump body abutting the frame when the dump body is in the lowered position.

19. The dump body of claim 1, wherein the front support assembly is disposed rearward of the front wall.

\* \* \* \* \*